March 15, 1949.   E. W. SHAND   2,464,266
PYROLYTIC CONVERSION OF HYDROCARBONS
Filed April 30, 1947
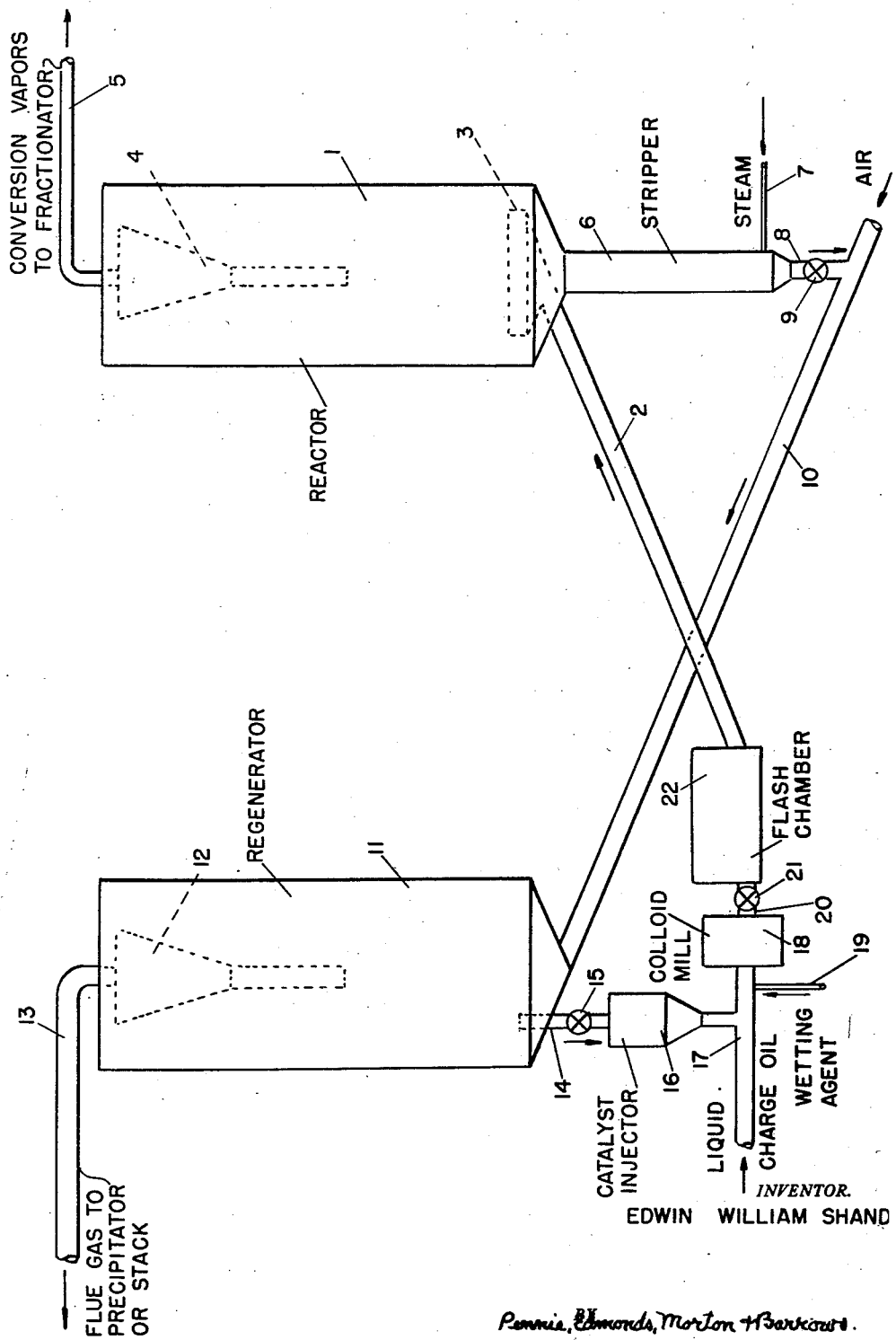
INVENTOR.
EDWIN WILLIAM SHAND
ATTORNEYS Patented Mar. 15, 1949

2,464,266

UNITED STATES PATENT OFFICE 2,464,266

PYROLYTIC CONVERSION OF HYDRO-CARBONS

Edwin William Shand, Homewood, Ill., assignor to Sinclair Refining Company, New York, N. Y., a corporation of Maine Application April 30, 1947, Serial No. 745,048

4 Claims. (Cl. 196—52)

This invention relates to the pyrolytic conversion of hydrocarbons and, more particularly, to pyrolytic conversion processes involving the use of a finely divided catalyst.

The invention is especially applicable to conversion processes of the general type, wherein a finely divided catalyst, at elevated temperature, in suspension in vaporized charge oil, is passed to a reactor in which conversion of the oil occurs and in which the spent catalyst is separated from the oil vapors, the separated catalyst stripped of oil, regenerated, and the regenerated catalyst returned to the reactor in suspension in vaporized charge oil. Operations of the type described are commonly designated fluid catalyst processes.

One of the problems confronting the industry in the practical operation of such processes has been the difficulty of effecting thorough and uniform contact between the catalyst and the hydrocarbon vapors in the reactor. Where the extent of contact with the catalyst of uniform activity is not uniform, a lack of uniformity of conversion products is apt to result.

I have found that uniformity of contact between the catalyst and oil vapors in the reaction zone is promoted by thorough and uniform dispersion of the catalyst in the hydrocarbon vapors, prior to introduction into the reactor.

In conventional practice, the hot catalyst is passed from the regenerator into a current of hot hydrocarbon vapors to be converted, and is carried along by the vapor stream directly to the reactor.

In my copending application, Ser. No. 745,049, filed concurrently herewith, I have disclosed a method of effecting a more thorough and uniform dispersion of the catalyst in the oil vapors passing to the reactor, in accordance with which the catalyst is admixed with the charge oil in the liquid state, and under super-atmospheric pressure, and the liquid-catalyst suspension flashed into vapors by reducing the pressure thereon, prior to introduction to the reaction zone. My present invention constitutes a further improvement in the process therein disclosed.

In accordance with my present invention, the catalyst to be introduced into the reaction zone is dispersed in the charge oil in liquid phase by a grinding action, for instance, by passing the admixed catalyst and oil through a colloid mill, in the presence of a wetting agent and, while under super-atmospheric pressure. The hydrocarbon constituent is, thereafter, vaporized by flashing the mixture into a chamber of lower pressure and the vapors, with the catalyst thoroughly dispersed therein, is passed to the reaction zone in the customary manner.

Catalysts dispersed and suspended in the vapors, in accordance with my present invention, exhibit a lesser tendency to drop out of suspension and, accordingly, a more uniform contacting and conversion in the reaction zone is attained.

The wetting agent serves to expedite the thorough wetting of the catalyst by the oil. Lecithin, for instance, may be used, with advantage, for this purpose. However, many so-called wetting agents, known to promote the wetting of solids with oil, are available and may be used instead of lecithin.

The rapid and thorough wetting of the catalyst with the oil appears to serve the dual purpose of promoting a more thorough and complete dispersion of the catalyst in the liquid and in the vapors upon flashing. It also appears to promote a more intimate and uniform contacting of the oil vapors with the catalyst surfaces in the reaction zone.

By reason of the sudden flashing of the liquid hydrocarbons into vapor, there appears to be a breaking up of agglomerates of the ultimate particles of catalysts by a sort of explosive action. The thorough wetting of the catalyst with the oil appears to make this explosive action more effective in breaking up agglomerates. But, whatever the explanation, a more thorough dispersion of the catalyst in the oil vapors is obtained than is obtained in conventional practice, according to which the catalyst is merely introduced into a flowing stream of oil vapors passing to the reactor.

The optimum amount of wetting agent employed will depend upon the particular wetting agent used, the type and proportions of catalyst used, the type of charge oil, and, to some extent, upon the mechanical mixing method used to disperse the catalyst in the liquid charge oil. Usually, about 0.01 to 0.05% by volume of any of the recognized wetting agents—lecithin, for instance—will suffice for this purpose.

The present invention provides an improvement process adapted to continuous operation and comprising a plurality of cooperating steps so coordinated as to constitute a uniform operation in which a charge of catalyst is repeatedly used and intermittently regenerated and returned to the cracking zone, in exceptionally uniform and thorough dispersion in the oil vapors. The invention further provides an improved apparatus particularly adapted to the carrying out of the process.

The invention will be further described and illustrated by reference to the accompanying drawing, which represents, conventionally and diagrammatically, a flow diagram of a fluid catalyst cracking operation embodying my invention.

Referring more particularly to the accompanying drawing, the apparatus, indicated by the reference numeral 1, represents a generally cylindrical reactor of conventional type. The finely divided catalyst, suspended in vaporized charge oil enters the reactor through conduit 2 extending into the reactor and terminating in a conical member 3, of somewhat smaller diameter than the reactor and opening into the reactor through a conventional grid. As the hot vapors pass upwardly in the reactor there is a tendency for the catalyst to drop out of suspension forming a so-called "high density" or "dense phase" fluidized body of catalyst in the reactor, which flows downwardly through the annular space between the member 3 and the walls of the reactor.

Oil vapors, product of the conversion, rise to the top of the reactor, pass through a cyclone type separator 4, to remove suspended catalyst from the vapors, the latter passing therefrom through conduit 5 to fractionating apparatus, not shown, the separated catalyst dropping back into the dense phase body of catalyst in the reactor.

Spent catalyst, flows from the bottom of the reactor into the stripping column 6, and passes downwardly therethrough countercurrent to steam injected into the lower part of the stripping column through line 7. The stripping spent catalyst flows from the bottom of the stripper through conduit 8, in which there is interposed a valve arrangement 9 for controlling a flow of the catalyst, advantageously, a conventional type slide valve. From thence, the spent catalyst flows into conduit 10 where it is picked up by a current of air and carried into the bottom of the regenerator 11, of conventional type.

Upon contact of the air with the hot catalyst, the coke or carbon deposited on the catalyst is burned off, in the manner with which the art is familiar. The products of combustion pass from the top of the regenerator, through cyclone type separator 12, for the removal of suspended catalyst, and the flue gases pass off through conduit 13 to a precipitator or stack, not shown in the drawing.

Regenerated catalyst flows from the regenerator through regenerated catalyst leg 14, the flow being controlled by valve 15, into a conventional type catalyst injector 16.

The regenerated catalyst is forced by the injector 16 into conduit 17 in which it is picked up by a stream of preheated charge oil in liquid phase and under superatmospheric pressure. This preheated charge oil is advantageously heated to a temperature only slightly below that at which it is substantially completely vaporized under the existing pressure. Additional heat is supplied to the oil by contact with the hot catalyst.

The catalyst, in admixture with the charge oil, passes through conduit 17 to a mixer of the grinder type, advantageously a colloid mill, diagrammatically represented at 18. A wetting agent, such as previously described, may be injected into the catalyst-oil mixture through line 19, or may be previously admixed with the oil, or introduced during the grinding operation.

In the colloid mill, the catalyst is thoroughly dispersed in the liquid charge oil while still under superatmospheric pressure, and passes therefrom through conduit 20 to pressure release valve 21, and is flashed into vapors in the low pressure flash chamber 22. From the flash chamber, the charge oil in vapor phase, with the catalyst thoroughly dispersed therein, passes through conduit 2 to the reactor, as previously described.

The catalyst employed may be of the type conventionally used in fluid catalyst processes, for instance, a silica-alumina type catalyst in finely divided or powdered form. The reaction conditions may, likewise, be those conventionally used in operations of this type and, as understood by the art, the optimum temperatures and pressures will depend primarily upon the type of stock used, the particular catalyst employed, and the reaction desired. In cracking gas oil, for instance, the reaction temperature may, with advantage, be within the range of about 800° to 1,000° F. and the pressure at the top of the reactor within the range of about 5 to 25 pounds per square inch. The regeneration temperature will usually be within the range of 950° to 1,200° F.

Where gas oil is used as the charge oil, it is advantageously preheated to a temperature within the range of about 600° to 900° F. under a superatmospheric pressure of, say, 50 to 400 pounds per square inch and, in the flash chamber, this pressure is advantageously reduced to that merely sufficient to force the resultant vapor-catalyst suspension through the system at the desired operating pressure. When using lighter charge oil, it may be preheated to a somewhat lower temperature.

It will be understood that the present invention is not restricted to the particular embodiment thereof herein described, but is applicable to various modifications of fluid catalyst processes.

I claim:

1. In the fluid catalyst process for the conversion of hydrocarbons wherein a finely divided catalyst, suspended in oil vapors, is passed to a reaction zone, the spent catalyst from the reaction zone is stripped of oil, regenerated, and returned to the reaction zone, the improvement which comprises grinding together the catalyst and hydrocarbon charge oil in liquid state and under super-atmospheric pressure in the presence of a wetting agent, flashing the hydrocarbon oil to vapor by pressure reduction and passing the resulting vapors with the catalyst suspended therein to the reaction zone.

2. In the fluid catalyst process for the conversion of hydrocarbons wherein a finely divided catalyst, suspended in oil vapors, is passed to a reaction zone, the improvement which comprises grinding together the catalyst and hydrocarbon oil in liquid state and under super-atmospheric pressure in the presence of a wetting agent, flashing the hydrocarbon oil to vapor by pressure reduction and passing the resulting vapors with the catalyst suspended therein to the reaction zone.

3. In the fluid catalyst process for the conversion of hydrocarbons wherein a finely divided catalyst suspended in oil vapors is passed to a reaction zone, the improvement which comprises grinding together the catalyst and hydrocarbon charge oil in liquid state and under super-atmospheric pressure in the presence of lecithin, flashing the hydrocarbon oil to vapor by pressure reduction and passing the resulting vapors with the catalyst suspended therein to the reaction zone.

4. Apparatus adapted to the catalytic conversion of hydrocarbons which comprises a vertically elongated reaction chamber, conduit means for withdrawing hydrocarbon vapors from the reaction chamber, an enlarged flash chamber, conduit means connecting the flash chamber with the reaction chamber, mixing means, a conduit leading to said mixing means and adapted to the passage of hot liquid hydrocarbons therethrough under super-atmospheric pressure, catalyst injector means adapted to the injection of finely divided catalyst into the last said conduit against super-atmospheric pressure in the conduit, conduit means connecting the mixing means with the flash chamber and a pressure reducing valve in the last said conduit.

EDWIN WILLIAM SHAND.

REFERENCES CITED

The following references are of record in the file of this patent:

UNITED STATES PATENTS

| Number | Name | Date |
|---|---|---|
| 1,993,386 | Schoenemann | Mar. 5, 1935 |
| 2,206,729 | Pier et al. | July 2, 1940 |
| 2,237,339 | De Florez | Apr. 8, 1941 |
| 2,360,992 | Weiss | Oct. 24, 1944 |